United States Patent
Bichlmaier et al.

[11] Patent Number: 5,506,567
[45] Date of Patent: Apr. 9, 1996

[54] PROCESS FOR MONITORING THE OPENINGS TO AN ENCLOSED SPACE

[75] Inventors: Günther Bichlmaier, Nürnberg; Ferdinand Friedrich, Heroldsberg; Dieter Gräfje, Erlangen; Udo Teubert, Neumarkt; Hans-Joachim Fach, Nürnberg; Thomas Rupprecht, Moosbach; Reiner Doefler, Nürnberg; Rainer Ertel, Zirndorf; Gerhard Hettich, Dietenhofen; Werner Wiedemann, Herzogenaurach; Peter Robitschko; Bernhard Dilz, both of Sindelfingen, all of Germany

[73] Assignee: Temic Telefunken microelectronic GmbH, Heilbronn, Germany

[21] Appl. No.: 313,853

[22] Filed: Sep. 26, 1994

[30] Foreign Application Priority Data

Oct. 7, 1993 [DE] Germany ............... 43 34 197.7

[51] Int. Cl.⁶ .................................................. G08B 13/18
[52] U.S. Cl. .......................... 340/555; 340/600; 340/545; 340/550
[58] Field of Search ................... 340/555, 565, 340/545, 550, 552, 600

[56] References Cited

U.S. PATENT DOCUMENTS

| | | | |
|---|---|---|---|
| 4,797,548 | 1/1989 | Köbbing . | |
| 4,864,278 | 9/1989 | Wiley | 340/555 |
| 4,879,461 | 11/1989 | Philipp | 340/555 |
| 4,949,075 | 8/1990 | Kürti | 340/555 |
| 5,025,895 | 6/1991 | Leone | 340/555 |
| 5,119,069 | 6/1992 | Hershkovitz | 340/555 |

FOREIGN PATENT DOCUMENTS

| | | |
|---|---|---|
| 0226694 | 7/1987 | European Pat. Off. . |
| 3407426 | 1/1988 | Germany . |
| 3316010 | 11/1989 | Germany . |
| 4030607 | 4/1992 | Germany . |
| 80/02764 | 12/1980 | WIPO . |
| 86/01061 | 2/1986 | WIPO . |

*Primary Examiner*—Brent A. Swarthout
*Assistant Examiner*—Albert K. Wong
*Attorney, Agent, or Firm*—Spencer & Frank

[57] ABSTRACT

A process for monitoring an opening of an enclosed space by an IR alarm system, wherein: a measuring process is generated whereby a modulated IR beam is emitted by at least one IR emitting element of an optoelectronic unit in the form of a pulse and the beam reflected from marginal areas of the opening is detected as a measurement signal by at least one IR receiving element of the optoelectronic unit, with the directional characteristic of th IR beam being matched, by optical components in the path of the beam, to the opening being monitored; the measurement signal detected by the receiving element is compared with a mean value of the previous measurement signals, and a normal operating mode of the alarm system is initiated if there is an approximate correlation between the measurement signal and the mean value, or an alarm operating mode of the alarm system is initiated if there is a significant deviation between the measurement signal and the mean value; in the normal operating mode, the next measuring process is generated after a pause in time, during which the control unit, emitting element and receiving element are switched off; and, in the alarm operating mode, a number of measuring processes are generated in immediate succession and compared with criteria stored in the control module, and an alarm signal is tripped if the measurement signals from the measuring processes correspond with the stored criteria.

6 Claims, 3 Drawing Sheets

PROCESS FOR MONITORING THE OPENINGS TO AN ENCLOSED SPACE

DESCRIPTION OF THE PRIOR ART

The openings to enclosed spaces are generally monitored by alarm systems which make use of reflective IR light barriers. As a rule, these use retro-reflectors which reflect the beam emitted from IR emitting diodes; an alarm being triggered if the reflected light beam is interrupted. This system, however, has certain disadvantages, i.e.

Only a few specific directions are monitored (a great many emitting diodes would be required to provide complete monitoring of the openings to a space).

It is possible for the alarm system to be easily "outwitted", since the detection system only determines the interruption of the light beam without carrying out any precise evaluation (intensity appraisal).

To prevent false alarms reliably, the trip thresholds for an alarm incident must be set relatively high; however, since the monitored space is large relative to the spatial element in which an incident (intrusion) takes place and the signal changes are thus correspondingly small, considerable gaps in the monitoring process occur.

When glazed openings (e.g. windows) are monitored, the high degree of IR penetrability from outside cause interference and the possible triggering of false alarms.

SUMMARY OF THE INVENTION

The invention is based on the objective of indicating a process whereby the aforementioned disadvantages are avoided, which ensures a high avoidance of false alarms and a minimum of unmonitored areas, and which consumes little energy. This objective is achieved according to the present invention by a process for monitoring an opening of an enclosed space by an IR alarm system, wherein: a measuring process is generated, by a control module with a control unit, an optoelectronic unit and an optical unit, wherein a modulated IR beam is emitted by at least one IR emitting element of the optoelectronic unit in the form of a pulse and the beam reflected from the marginal areas of the opening is detected as a measurement signal by at least one IR receiving element of the optoelectronic unit, with the directional characteristic of the IR beam being matched by optical components in the optical unit and disposed in the beam path, to the respective opening to be monitored; the measurement signal, with ambient light content eliminated, detected by the receiving element is evaluated by the control unit control module by a comparison of the measurement signal with a mean value of previously measurement signals and, depending on this comparison, the normal operating mode or the alarm operating mode of the alarm system is selected; the normal operating mode is selected if there is an approximate correlation between the measurement signal and the mean value, and in the normal mode the next measuring process is generated after a pause in time during which the control unit, the emitting element and the receiving element are switched off; and the alarm mode is selected if there is a significant deviation between the measurement signal and the mean value, and in the alarm mode a number of measuring processes are generated in immediate succession and evaluated by a comparison with criteria stored in the control module such that the penetration of objects or persons through the monitored opening is identified, and an alarm signal is tripped if the measurement signals from the measuring processes correspond with the stored criteria.

Advantageous developments of the process complying with the invention likewise are described.

The process presented combines a number of advantages, i.e.

By virtue of the arrangement and design of the components of the optoelectronic unit (emitter and receiver), and the components of the optical unit, a directional characteristic for the IR beam can be concentrated in one spatial direction and matched to the spatial openings, thus achieving a curtain-like monitoring function along the individual openings (i.e. along the area of possible intrusions), without the IR beam penetration outside the space; as a result, a sharply defined limit of the monitored area is achieved. If a body penetrates the monitored area, the detected reflected signal changes very markedly (high dynamics), so that (even with the penetration of small objects) monitored gaps are minimized, yet a high degree of false alarm avoidance is assured with respect to external interference.

By means of a two-mode operation (normal mode, alarm mode) with a mode-dependent repeat rate for the measuring process, a substantial saving in electricity can be achieved, with the result that the potential operating duration of the alarm system can be significantly prolonged when powered by a battery; in the normal (economy) mode, a measuring process per monitored area is generated at greater intervals (e.g. every 50 ms), while during the intervening pauses the monitoring elements are switched off and only reactivated at the conclusion of the period of inactivity; only when the difference between the current measured value and the (adjusted) mean value from previous measurements exceeds a preset threshold, does the system go into the alarm mode, a sequence of (e.g. 100) measuring processes at substantially shorter intervals (e.g. 1 ms) being generated—the results of which are evaluated in accordance with stored criteria and a distinction thus made between interference and actual intrusions.

In so far as the IR receiving diodes measure the proportion of ambient light (arising e.g. from the reflection sunlight or otherwise produced reflection) simultaneously with the measurement signal (usable signal) and by virtue of the linearization of the characteristic graph of the IR receiving diodes (by converting the measured value to the value of the usable signal without ambient light, the ambient light dependency on the amplitude of the usable signal is suppressed), sensitivity to external interference is reduced and the evaluation process improved. In this way the alarm triggering threshold can be reduced to prevent false alarms, whereby the sensitivity to intrusions is increased.

By means of an adjustable preamplifier, the measuring range of the receiving diodes is adjusted in an adaptation phase (this occurs after each activation of the alarm system, after each alarm incident and after the reference value has drifted from a variable limit window) in such a way that the measurement signal in the undisturbed condition (this value is stored as the reference value) lies in the middle of the measuring range; this leads to the best possible detection and evaluation of measurement signal changes in the event of intrusions or interference (since the measurement signal in undisturbed condition can slowly drift as a result of external influences such as temperature, this is adjusted in the usual way by filtering and mean value generation, and stored on each occasion as a new reference value.

DESCRIPTION OF THE DRAWINGS

An example of a form of execution will be described with reference to FIGS. 1–3 with regard to a process for the protection of the passenger compartment of a motor vehicle by monitoring the windows.

In this case.

DESCRIPTION OF A PREFERRED EMBODIMENT

Figure 1:
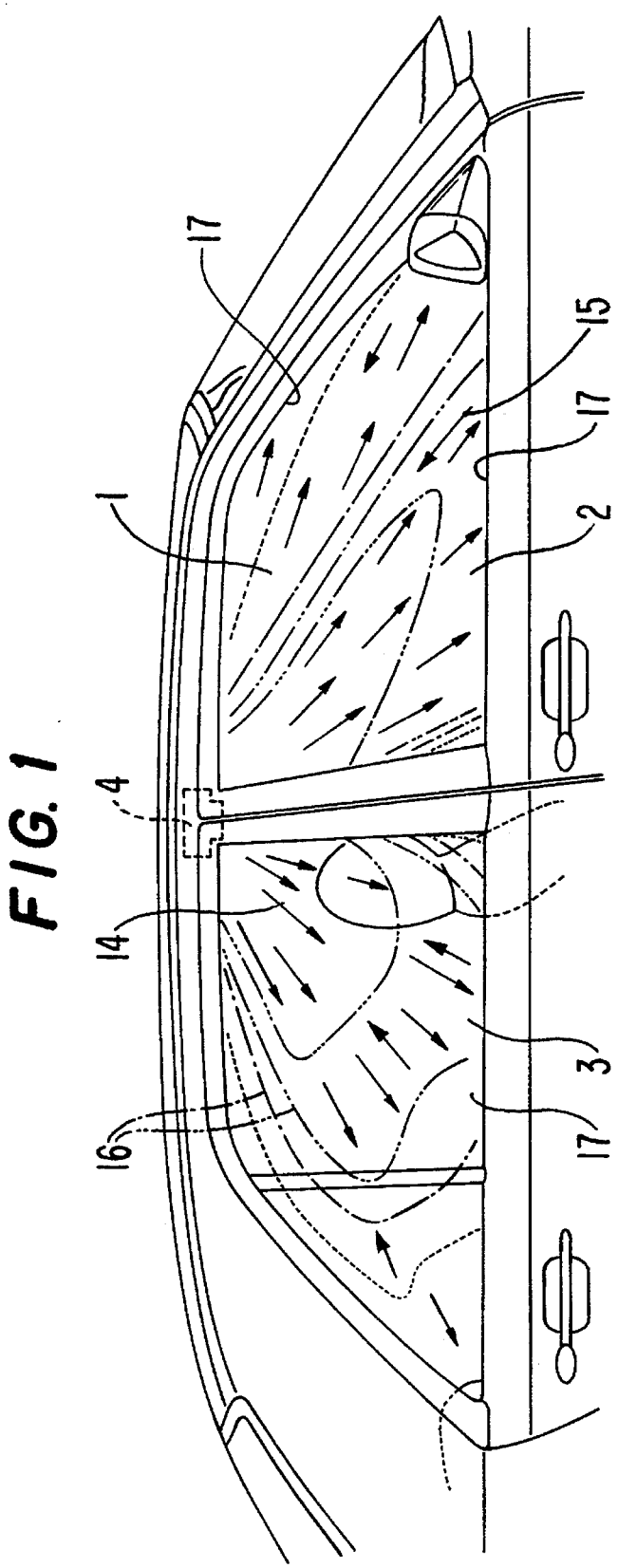
FIG. 1 depicts a side view of the vehicle with its two sides windows.

In FIG. 1, the lines of equal sensitivity or signal change (isometric line 16) for the two side windows 2, 3 of the vehicle are represented superimposed on the emitting characteristics of the emitted IR beam 14 and the receiving characteristics of the detected reflected IR beam 15. The directional characteristic of the IR beam (of e.g. 950 nm wavelength) reproduces the shape or geometry of the windows 2, 3; as result of the variations in the range of the emitted beam 14 in the various directions, a monitoring curtain, as it were, is formed along the two windows 2, 3. In this way, effective protection is provided against intrusions into the passenger compartment 1 of the vehicle through the side windows 2, 3 or against the theft of articles from the passenger compartment 1 of the vehicle by way of side windows 2,3.

Figure 2:
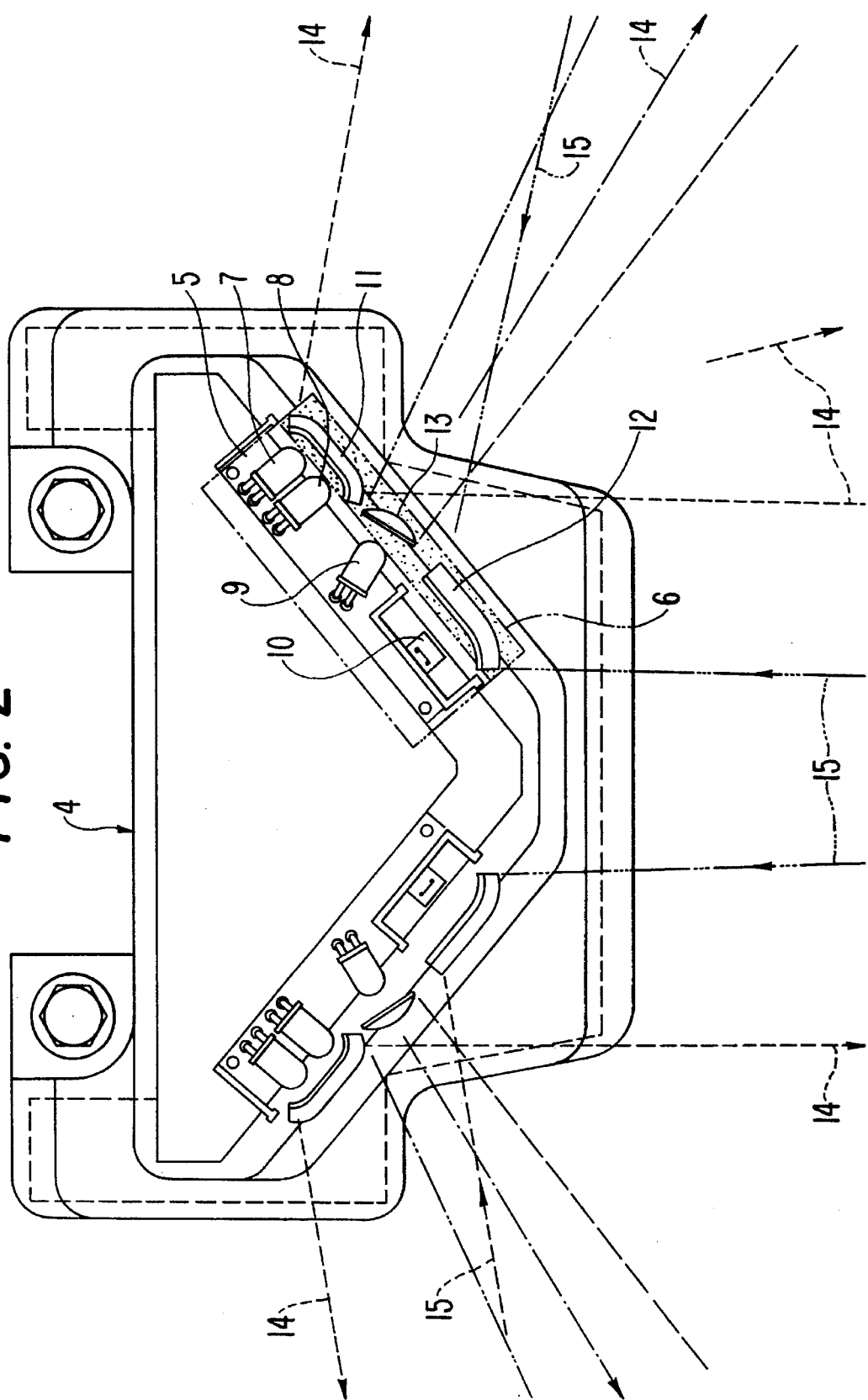
FIG. 2 depicts the control module with optoelectronic unit and optical unit and FIG. 3 comprises a flow diagram showing the control sequence for the monitoring process.

The directional characteristic of the IR beam is achieved in accordance with FIG. 2 by the control module 4 through the combination of an optoelectronic unit 5 (emitting elements 7, 8, 9, receiving element 10) with an optical unit 6 and optical components 7, 8, 9, 10 of the optoelectronic unit 5. Typically, three IR emitting diodes 7, 8, 9 are provided for each window 2, 3 as the emitting elements and one IR receiving diode 10 as the receiving element. An aspherical, plano-convex, cylindrical lens 12, 11 is mounted in front of receiving diode 10 and in front of each of two emitting diodes 7, 8 through which th emitted beam 14 or reflected beam 15 is heavily concentrated in one direction, but does not change perpendicular thereto; an aspherical condenser lens 13 is mounted in front of one emitting diode 9, which serves as a "spot" to illuminate the corner of the window at the furthest distance (mirrors or holographic optical elements can be used instead of cylindrical lenses as the component of the optical unit 6, given the appropriate positioning of the optoelectronic element 7). Each window 2, 3 is individually monitored by a separate combination of an optoelectronic unit 5 and optical unit 6. The isometric lines 16 of the sensitivity curve (shown in FIG. 1) are determined by the superimposition of the emitting and receiving characteristics of the individual emitting elements 7, 8, 9 and receiving element 10. As far as possible, these should comply with the geometric shape of the side windows 2, 3 of the vehicle—this can be achieved e.g. by the suitable selection and arrangement of the components of the optical unit 6 of components of the optoelectronic unit 5.

Figure 3:
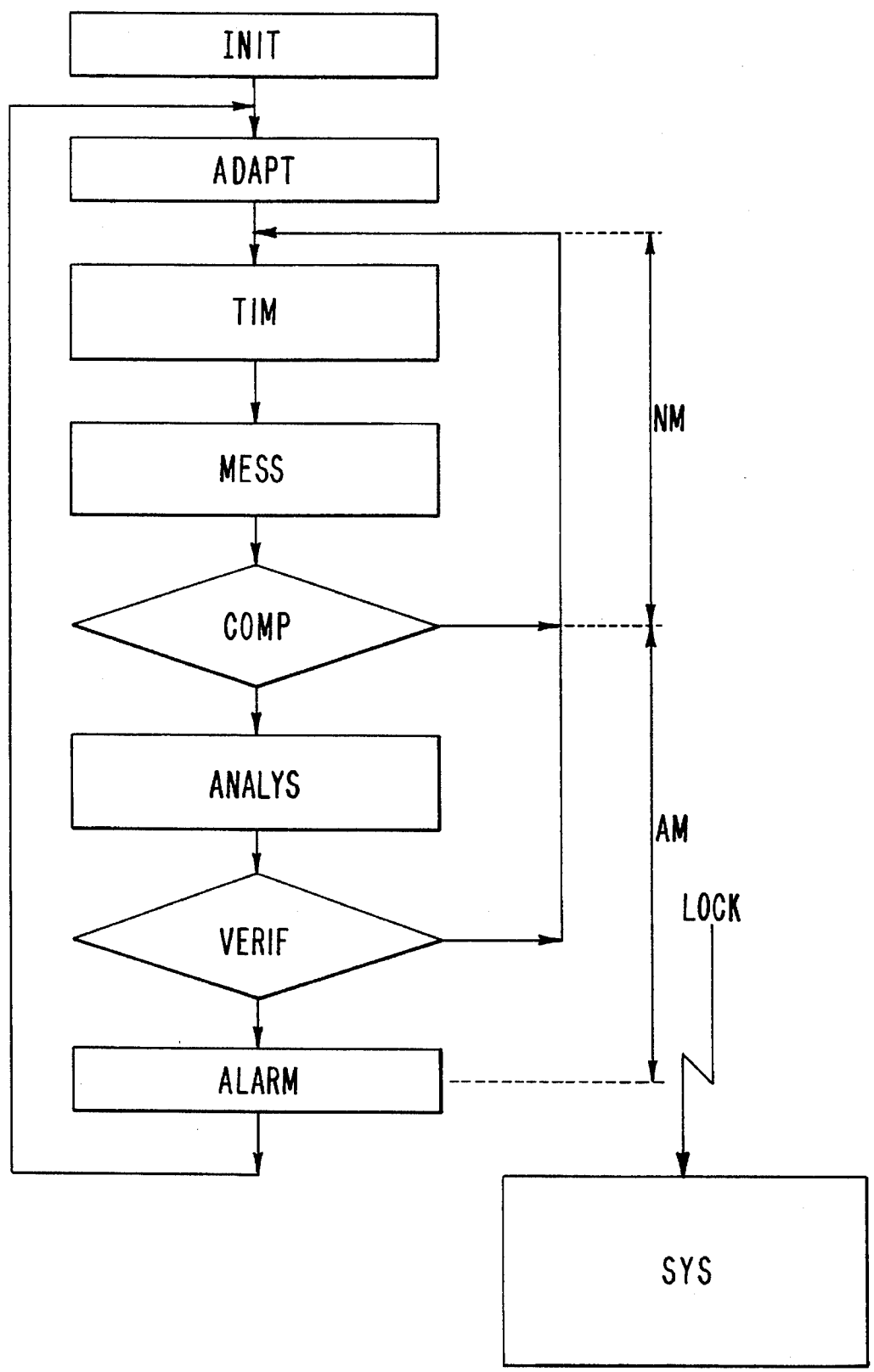

The operating sequence of the process is clarified by reference to the flow diagram in FIG. 3. The alarm system SYS can be activated and deactivated by the locking process Lock (activation of the locking cylinder in the vehicle door or of a remote central locking system). After the system SYS has been activated and initialization INIT has taken place, a system matching process ADAPT takes place, with system parameter adaptation (determination of the measuring range, adjustment of the receiving diodes . . . ) and plausibility checks. On the identification of a signal from a timer TIM (which typically takes place at intervals of 250 ms), a measuring process MESS is carried out in the normal mode NM—the individual steps in this case being as follows: transmission of a pulse-type IR emitted signal consisting of e.g. 32 pulses each at 50 kHz; measurement of the modulated IR reflected signal; measurement of ambient light intensity; ambient light adjustment of the IR signal received by the receiving diodes. By a comparison COMP of the IR signal with the reference value and with preset thresholds, a decision is made as to the subsequent process. If no alarm is suspected, the normal mode NM maintained, the system components are switched off and only after a pause (typically 250 ms) determined by the time TIM are the component's reactivated. The inactive period of the alarm system (interval between two timer signals TIM) must be selected in such a way that no articles can be taken from the passenger compartment, e.g. by rapid access through the said window, without the alarm being tripped. If a threshold value (or threshold values) is exceeded, a suspected alarm condition arises and the system goes from the normal mode NM into the alarm mode AM. In the alarm mode AM, the suspected alarm is first analyzed and checked (ANALYS); for this purpose, a series of individual measurements are undertaken at short intervals (typically 32 individual IR measurements every 20 ms, each of 1 ms in duration), and the respective measurement result are classified by comparison with stored specimen values. A check is made in a verification stage VERIF as to whether the measured results can be assigned to the criteria or specimens typical of an alarm incident; failing this, interference is present, with the result that the system reverts to the normal mode NM and awaits the next timer signal TIM; otherwise, an alarm incident is identified, in which case an alarm signal ALARM is tripped by optical or acoustic means.

What is claimed is:

1. A process for monitoring an opening to an enclosed space by an IR alarm system, comprising the steps of:

providing a control module having a control unit with at least an IR emitting element for emitting an IR beam and at least one IR receiving element for detecting a reflected beam, and an optical unit including optical components disposed in the beam path for matching a directional characteristic of an IR beam emitted by the IR emitting elements and detected by the receiving element to the opening to be monitored;

generating a measuring process in which a modulated IR beam from at least one IR emitting element of the optoelectronic unit is emitted in the form of a pulse and the beam reflected at marginal areas of the opening is detected as a measurement signal by the at least one IR receiving element of the optoelectronic unit;

comparing the measurement signal, with ambient light content eliminated, detected by the receiving element with a mean value of previously detected measuring signals;

depending on the comparison, initiating a normal operating mode of the alarm system if there is a correlation between the measurement signal and the mean value, and initiating an alarm operating mode of the alarm system if there is no correlation;

in the normal operating mode, generating the next measuring process after a pause in time and switching off the control unit, the emitting elements and the receiving element during this pause in time; and, in the alarm operating mode, generating a number of measuring processes in immediate succession, comparing the detected measurement signals with criteria which are stored in the control module and which identify the penetration of objects or persons through the monitored opening, and triggering an alarm signal if the measurement signals of the measuring process correspond with the stored criteria.

2. A process according to claim 1, wherein said step of providing includes mounting the optical components of the optical unit in a fixed position relative to the emitting elements and receiving element of the optoelectronic unit.

3. A process according to claim 1, further comprising providing timing signals from a timing element to define the pauses in time during the normal operating mode.

4. A process according to claim 1, further comprising adjusting a measuring range for the measurement signal during an adaptation phase such that the measurement signal in the normal operating mode lies in the middle of a measurement range.

5. A process according to claim 4, further comprising initiating a said adaptation phase after every initial activation of the alarm system, after every case of triggering of an alarm, and after a reference value corresponding to the measurement signal in the normal operating range, has drifted out of a variable limit window.

6. A process according to claim 1, further comprising measuring the ambient light to provide a ambient light signal, and using the ambient light signal to convert the measurement signal to a value without the ambient light content, thereby eliminating the ambient light dependency of the IR receiving element.

* * * * *